US012281650B2

(12) United States Patent
Joo et al.

(10) Patent No.: US 12,281,650 B2
(45) Date of Patent: Apr. 22, 2025

(54) OIL PUMP NOT REQUIRING CHANGING POSITIONS OF SUCTION PORT AND DISCHARGE PORT ACCORDING TO FORWARD ROTATION AND REVERSE ROTATION

(71) Applicant: YOUNGSHIN PRECISION CO., LTD, Gyeongju-si (KR)

(72) Inventors: Do Jae Joo, Pohang-si (KR); Seong Wook Cha, Gyeongju-si (KR); Gahyeon Yi, Daegu (KR); Hui Do Ryu, Gyeongju-si (KR)

(73) Assignee: YOUNGSHIN PRECISION CO., LTD, Gyeongju-si (KR)

( * ) Notice: Subject to any disclaimer, the term of this patent is extended or adjusted under 35 U.S.C. 154(b) by 0 days.

(21) Appl. No.: 18/682,833

(22) PCT Filed: Aug. 5, 2022

(86) PCT No.: PCT/KR2022/011704
§ 371 (c)(1),
(2) Date: Feb. 9, 2024

(87) PCT Pub. No.: WO2023/018124
PCT Pub. Date: Feb. 16, 2023

(65) Prior Publication Data
US 2024/0352933 A1    Oct. 24, 2024

(30) Foreign Application Priority Data
Aug. 10, 2021    (KR) .......................... 10-2021-0105108

(51) Int. Cl.
*F04C 2/10* (2006.01)
*F04C 15/00* (2006.01)

(52) U.S. Cl.
CPC ............ *F04C 15/0065* (2013.01); *F04C 2/10* (2013.01); *F04C 2210/206* (2013.01); *F04C 2240/30* (2013.01)

(58) Field of Classification Search
CPC ........ F04C 15/0065; F04C 2/10; F04C 2/084; F04C 2/08; F04C 2/082; F04C 18/107;
(Continued)

(56) References Cited

U.S. PATENT DOCUMENTS 8,960,309 B2 *    2/2015    Davis .................... F04C 11/003
                                                        166/369
9,046,102 B2 *    6/2015    Naganuma .............. F04C 18/08
(Continued)

FOREIGN PATENT DOCUMENTS

JP    2008-291825    12/2008
JP    2015-121210    7/2015
(Continued)

OTHER PUBLICATIONS

Machine Translation KR 10-1587840 (Year: 2024).*
Written Opinion with English translation for International Application No. PCT/KR2022/011704, dated Nov. 25, 2022.

*Primary Examiner* — Dapinder Singh
(74) *Attorney, Agent, or Firm* — KILE PARK REED & HOUTTEMAN PLLC

(57) ABSTRACT

Disclosed is an oil pump including: a pump module provided with a rotary shaft, an inner rotor coupling with the rotary shaft, an outer rotor rotated engaging with the inner rotor, an inlet for sucking fluid, and an outlet for pressing and discharging the sucked fluid; housings supporting the pump module; and a direction switching unit coupled between the housings and the outer rotor to keep an eccentric distance between the rotary shaft or a central axis line of the inner rotor and a central axis line of the outer rotor. According to the disclosure, there is provided an oil pump used for
(Continued)

both forward rotation and reverse rotation, which does not require changing a suction area and a discharge area and direction switching is stably performed even when a power source rotates forwardly and reversely.

11 Claims, 9 Drawing Sheets

(58) Field of Classification Search
CPC .... F04C 18/1075; F04C 29/00; F04C 2210/206; F04C 2240/30
See application file for complete search history.

(56) References Cited

U.S. PATENT DOCUMENTS

| | | | |
|---|---|---|---|
| 10,190,671 B2 * | 1/2019 | Kito | F04C 15/06 |
| 10,344,759 B2 * | 7/2019 | Yamamoto | F04C 14/18 |
| 11,480,172 B2 * | 10/2022 | Yoshimura | F04C 2/086 |
| 2018/0112662 A1 * | 4/2018 | Hashiba | F04C 2/086 |
| 2019/0376511 A1 * | 12/2019 | Kobayashi | F04C 29/047 |

FOREIGN PATENT DOCUMENTS

| | | |
|---|---|---|
| KR | 10-0199501 | 6/1999 |
| KR | 10-2006-0098105 | 9/2006 |
| KR | 10-2016-0004453 | 1/2016 |
| KR | 10-1587840 | 1/2016 |
| KR | 101587840 B1 * | 1/2016 |
| KR | 10-2020-0024612 | 3/2020 |
| KR | 10-2177683 | 11/2020 |

* cited by examiner

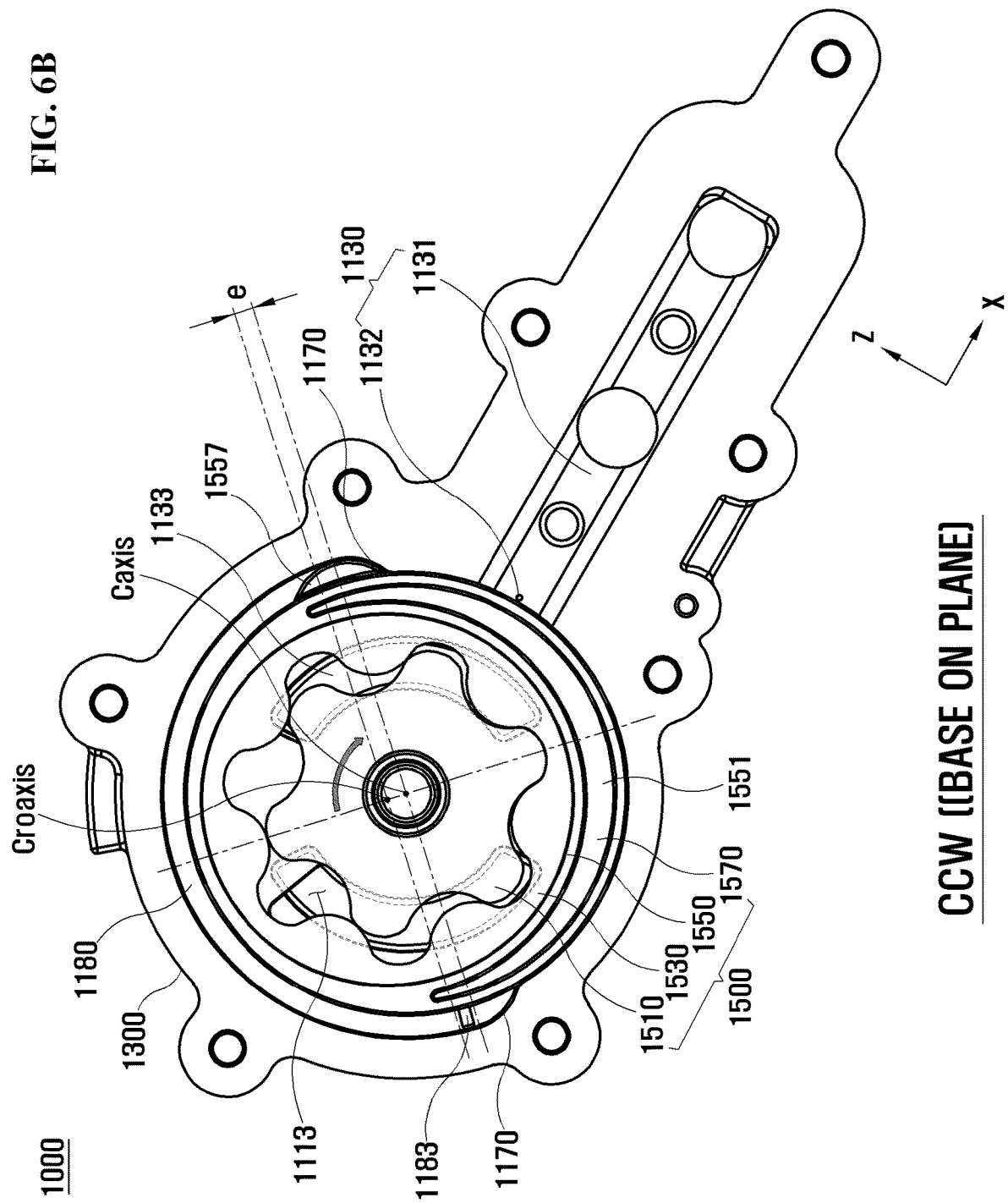

CW ((BASE ON PLANE)

CCW ((BASE ON PLANE)

OIL PUMP NOT REQUIRING CHANGING POSITIONS OF SUCTION PORT AND DISCHARGE PORT ACCORDING TO FORWARD ROTATION AND REVERSE ROTATION

TECHNICAL FIELD

The disclosure relates to an oil pump that does not require changing the positions of a suction area and a discharge area according to forward rotation and reverse rotation, and more particularly to an oil pump that does not require changing the positions of a suction area and a discharge area according to forward rotation and reverse rotation and is capable of cooling a power transmission unit, which has an improved structure to enable discharge even though the oil pump used in a vehicle or the like rotates forwardly or reversely.

BACKGROUND ART

A vehicle refers to a representative modern transport made up of many parts. Such a vehicle generates a lot of heat, especially, in an engine for power.

Recently, there has been a growing trend toward an electric vehicle that includes a battery and uses electric energy as a power source instead of a combustion engine using fuel.

Such an electric vehicle includes a motor having a traction function, i.e., a traction motor, and uses the rotational power of the traction motor as power for various other device.

One of the devices that use the power of the traction motor is an oil pump that supplies lubricating oil to parts where lubrication is required in the electric vehicle.

A conventional oil pump driven by the engine rotates in one direction because the engine rotates in one direction.

On the other hand, the oil pump driven by the power source that rotates forwardly and reversely like the traction motor of the electric vehicle needs a structure for both the forward rotation and the reverse rotation because the oil pump receives both the forward rotational power and the reverse rotational power. Accordingly, it is desired that the structure of the oil pump does not need to be changed according to the forward rotation and the reverse rotation.

DOCUMENTS OF RELATED ART

Korean Patent Publication No. 10-2006-0098105 (Sep. 18, 2006)
Korean Patent Publication No. 10-2016-0004453 (Jan. 13, 2016)
Korean Patent Publication No. 10-2020-0024612 (Mar. 9, 2020)

Technical Problem

An aspect of the disclosure is to provide an oil pump used for both forward rotation and reverse rotation, which does not require changing a suction area and a discharge area even when a power source rotates forwardly and reversely.

Further, another aspect of the disclosure is to provide an oil pump used for both forward rotation and reverse rotation, in which direction switching is stably performed even when a power source rotates forwardly and reversely.

Further, still another aspect of the disclosure is to provide an oil pump used for both forward rotation and reverse rotation, which has a wide application range because it does not require structural change even when a power source rotates forwardly and reversely, and has a simple structure, is convenient to use, and improves economic feasibility because it does not require additional parts.

Further, yet another aspect of the disclosure is to provide an oil pump that cools heat generated in parts where power transmission is performed.

Technical Solution

According to an embodiment of the disclosure, there is provided an oil pump including: a pump module provided with a rotary shaft, an inner rotor coupling with the rotary shaft, an outer rotor rotated engaging with the inner rotor, an inlet for sucking fluid, and an outlet for pressing and discharging the sucked fluid: housings supporting the pump module; and a direction switching unit coupled between the housings and the outer rotor to keep an eccentric distance between the rotary shaft or a central axis line of the inner rotor and a central axis line of the outer rotor.

Further, the eccentric distance may be kept but an eccentric direction of the eccentric distance with respect to a central axis line of the rotary shaft is different as the direction switching unit rotates upon change in a rotational direction of the rotary shaft.

Further, the oil pump may have a first position where the direction switching unit is kept stopped relative to the housings as the rotary shaft is rotated in a first direction and a second position where the direction switching unit is rotated from the first position and kept stopped relative to the housing as the rotary shaft is rotated in a second direction, wherein the first position and the second position are disposed forming 180 degrees with respect to the central axis line of the rotary shaft.

Further, the suction of the fluid into the inlet and the discharge of the pressurized fluid from the outlet are performed equally at both the first position and the second position.

Further, the housings and the direction switching unit may include engagement portions to keep the direction switching unit stopped at the first position and the second position, and the engagement portions may include a snag portion that sticks out from one of the housings and the direction switching unit, and a holding portion formed in the other one of the housings and the direction switching unit and engaging with the snag portion.

Further, one of the housings and the direction switching unit may include a sliding groove formed to guide the snag portion to move between the first position and the second position.

Further, high-pressure oil generated in the sliding groove may be discharged through a suction area for the suction while the snag portion gets stuck in the holding portion at the first position or the second position.

Further, the direction switching unit may rotate between the first position and the second position by frictional and inertial forces of the outer rotor rotated engaging with the inner rotor.

Further, a central axis line of an outer circumferential surface of the direction switching unit being in surface contact with an inner circumferential surface of the housing may be the same as a central axis line of the rotary shaft, and the central axis line of the inner circumferential surface of the direction switching unit being in surface contact with the outer circumferential surface of the outer rotor may be eccentric with the central axis line of the rotary shaft by the eccentric distance.

Further, the pump module may include a suction area where oil is sucked, and a discharge area where the oil sucked in the suction area is pressurized and discharged, the oil pump may further include a power transmission unit including a gear to rotate the rotary shaft, and the discharge area may include a mist hole branched from and passing through the discharge area to spray high-pressure oil to an area where the power transmission unit is engaged.

Further, the pump module may include the inner rotor coupling with the rotary shaft, and the outer rotor eccentrically rotated engaging with the inner rotor, the direction switching unit may include a switching portion skirt shaped like a ring to slide against the outer rotor; and a switching portion upper plate shaped like a plate, slidably coupled to the insides of the housings, closing an upper end of the switching portion skirt, and having an open area through which fluid is allowed to be sucked and discharged, and a plate surface of the switching portion upper plate may be partially recessed to reduce a contact area with the housings.

Further, the direction switching unit may rotate toward a set position with respect to the housings upon change in a rotational direction of the rotary shaft.

Advantageous Effects

According to the disclosure, there is provided an oil pump used for both forward rotation and reverse rotation, which does not require changing a suction area and a discharge area even when a power source rotates forwardly and reversely.

Further, there is provided an oil pump used for both forward rotation and reverse rotation, in which direction switching is stably performed even when a power source rotates forwardly and reversely.

Further, there is provided an oil pump used for both forward rotation and reverse rotation, which has a wide application range because it does not require structural change even when a power source rotates forwardly and reversely, and has a simple structure, is convenient to use, and improves economic feasibility because it does not require additional parts.

Further, there is provided an oil pump that cools heat generated in parts where power transmission is performed.

DESCRIPTION OF DRAWINGS

FIGS. 6A and 6B are cross-sectional views viewed from below to describe a first position and a second position of a direction switching unit.

BEST MODE

Below, a lubricating oil pump 1000 (hereinafter referred to as an 'oil pump') according to the disclosure, which does not require changing positions of a suction area and a discharge area according to forward rotation and reverse rotation will be described with reference to FIGS. 1 to 7B.

Figure 1:
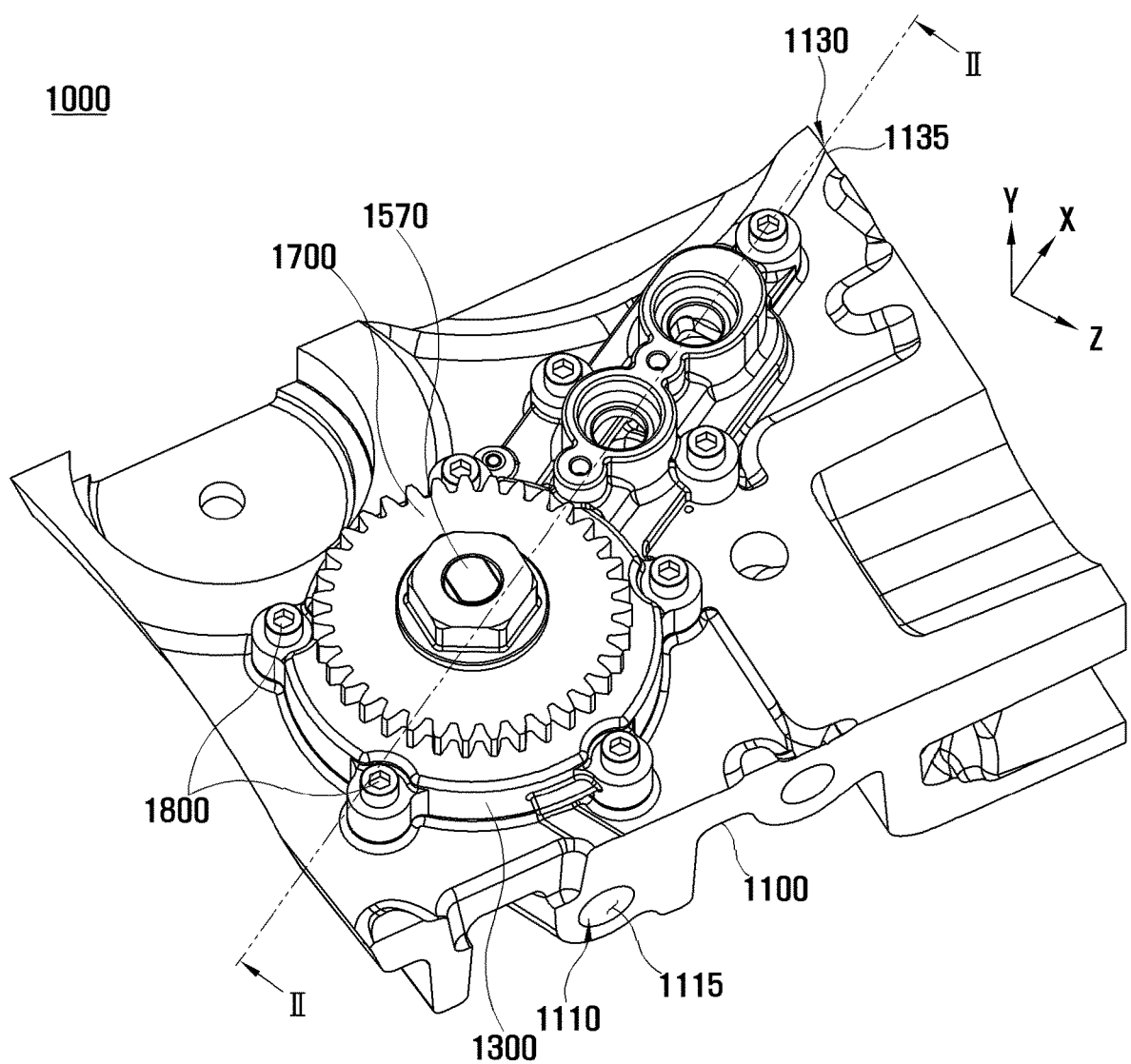
FIG. 1 is a perspective view of an oil pump according to an embodiment of the disclosure.
Figure 2:
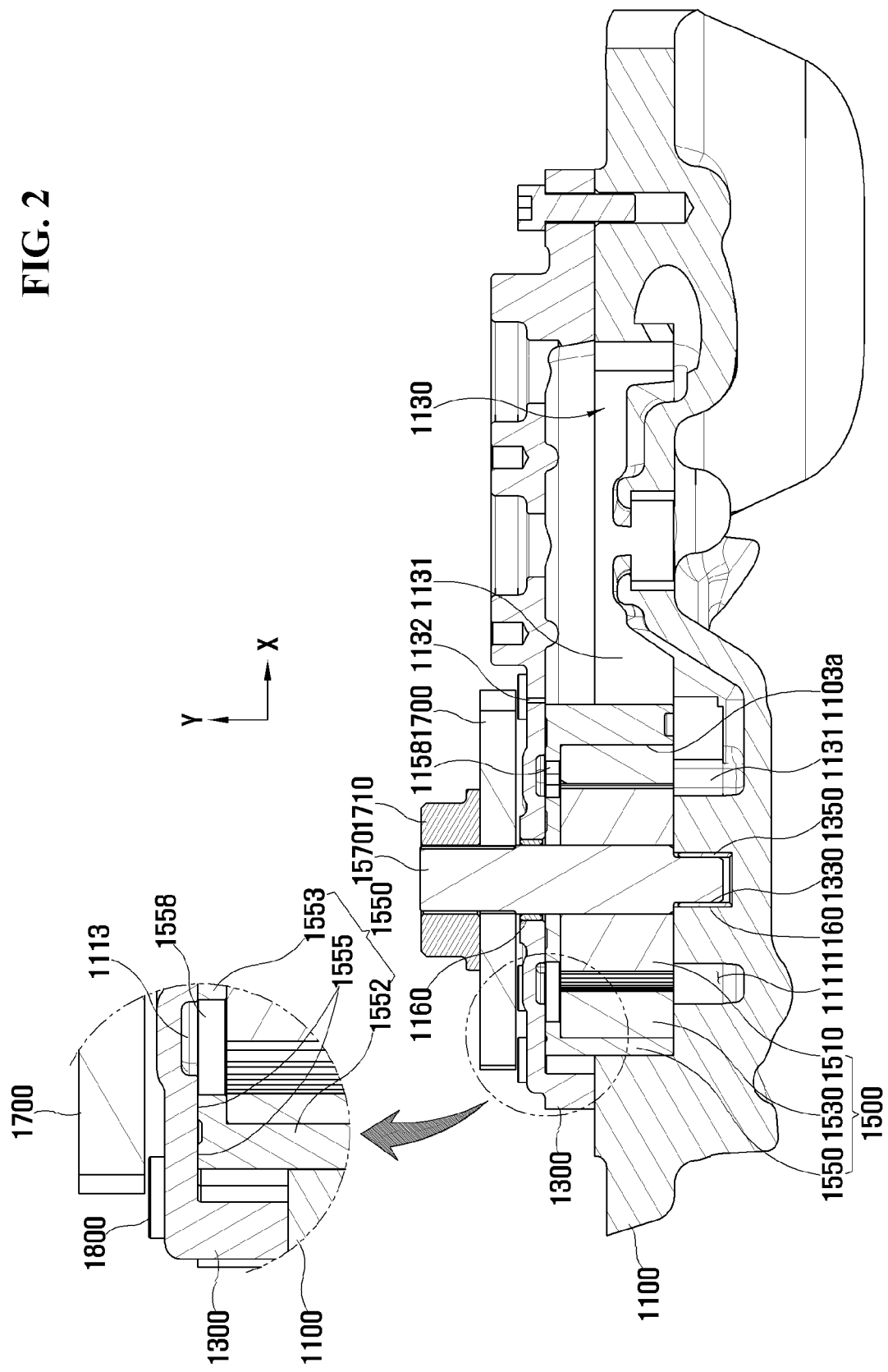
FIG. 2 is a cross-sectional view taken along line II-II in FIG. 1.
Figure 3:
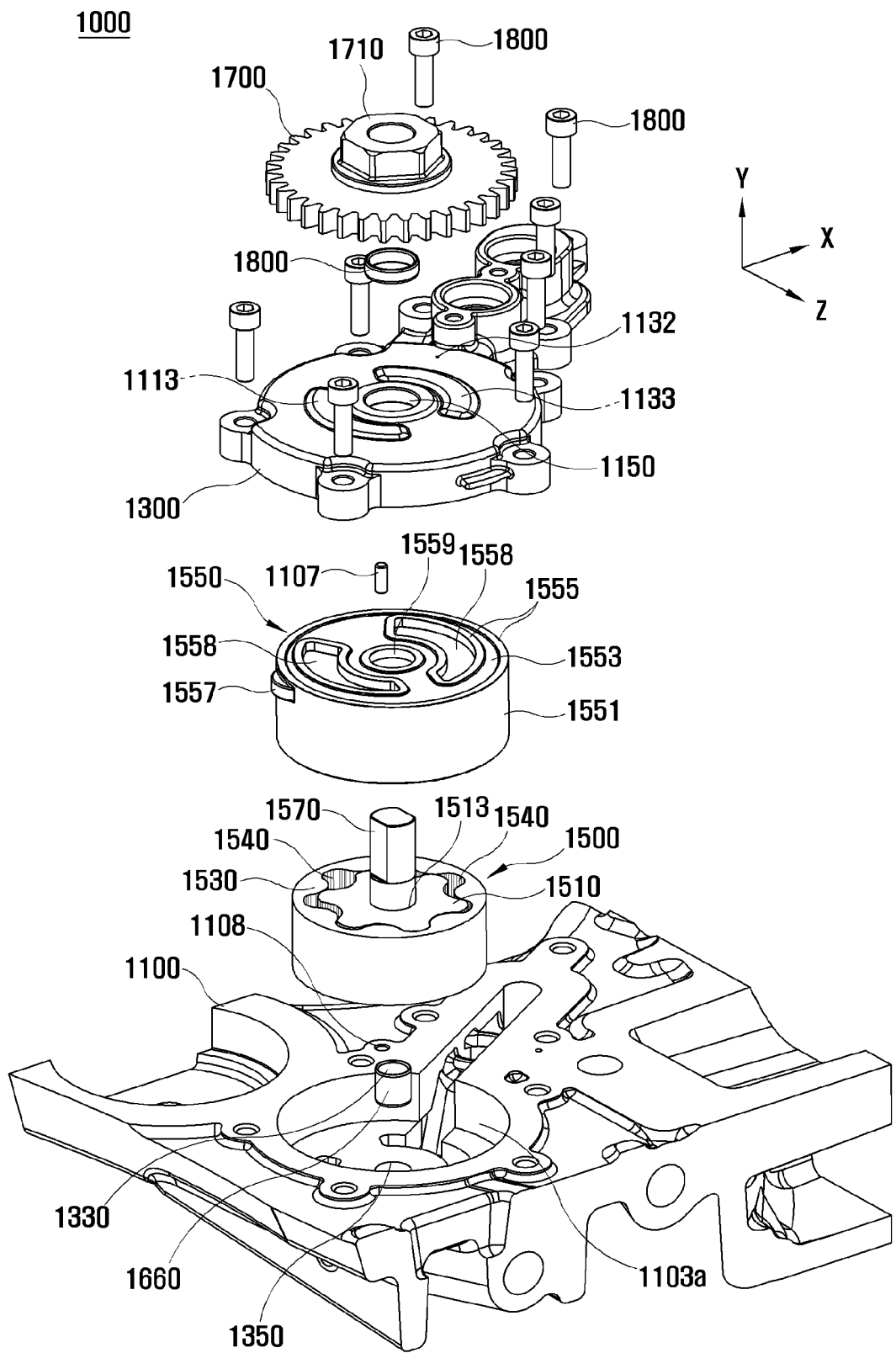
FIG. 3 is an exploded perspective view of an oil pump.
Figure 4:
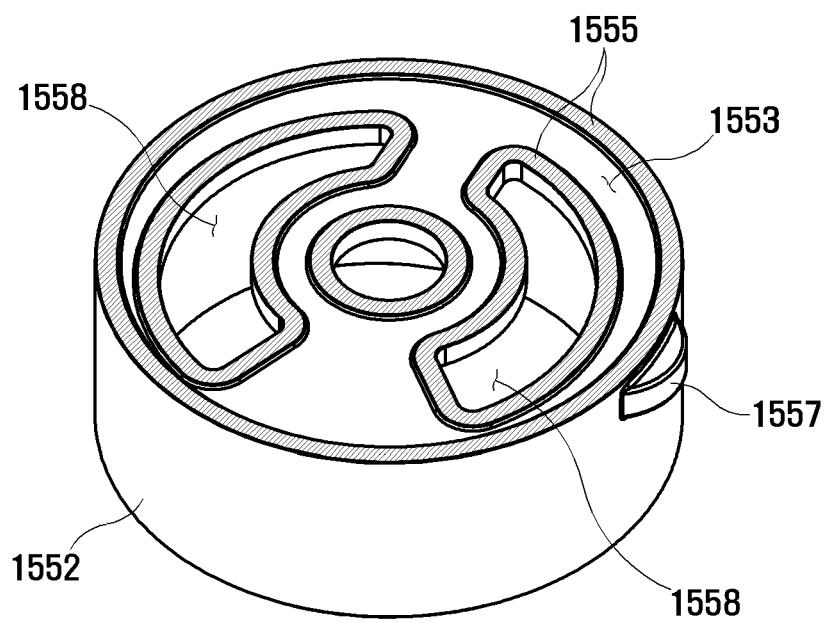
FIG. 4 is a perspective view of a direction switching unit.
Figure 5:
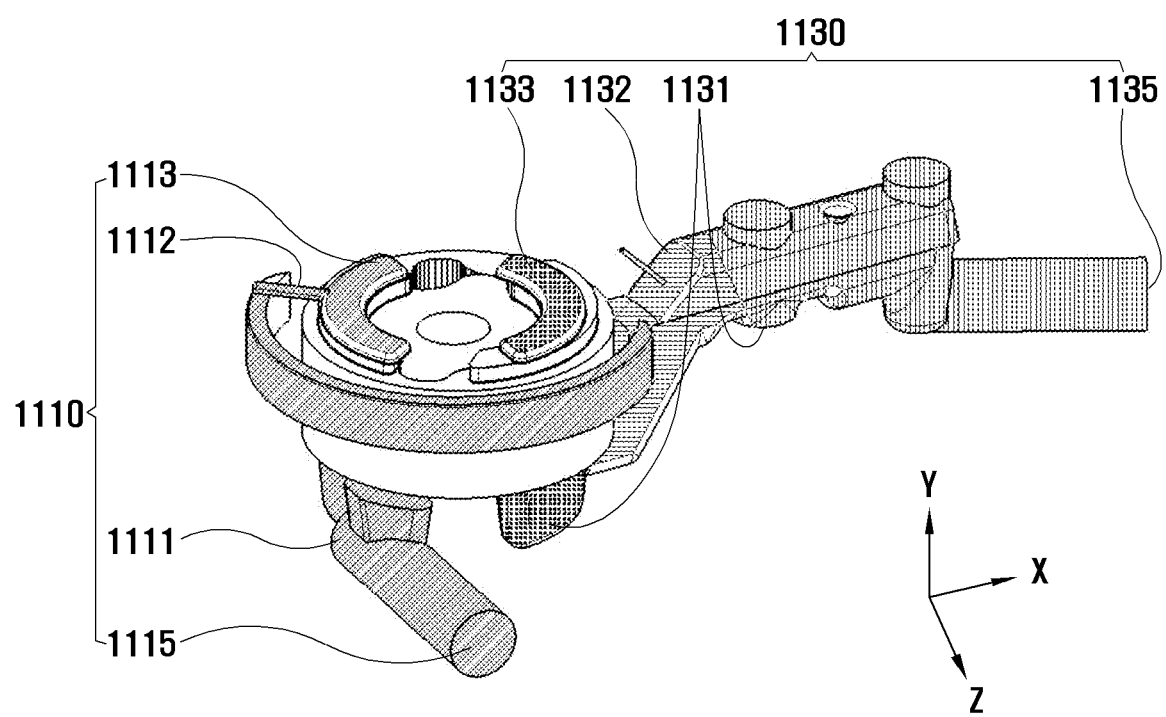
FIG. 5 illustrates modeling that shows a process of sucking and discharging oil in a suction area, a pump model, and a discharge area.
Figure 6A:
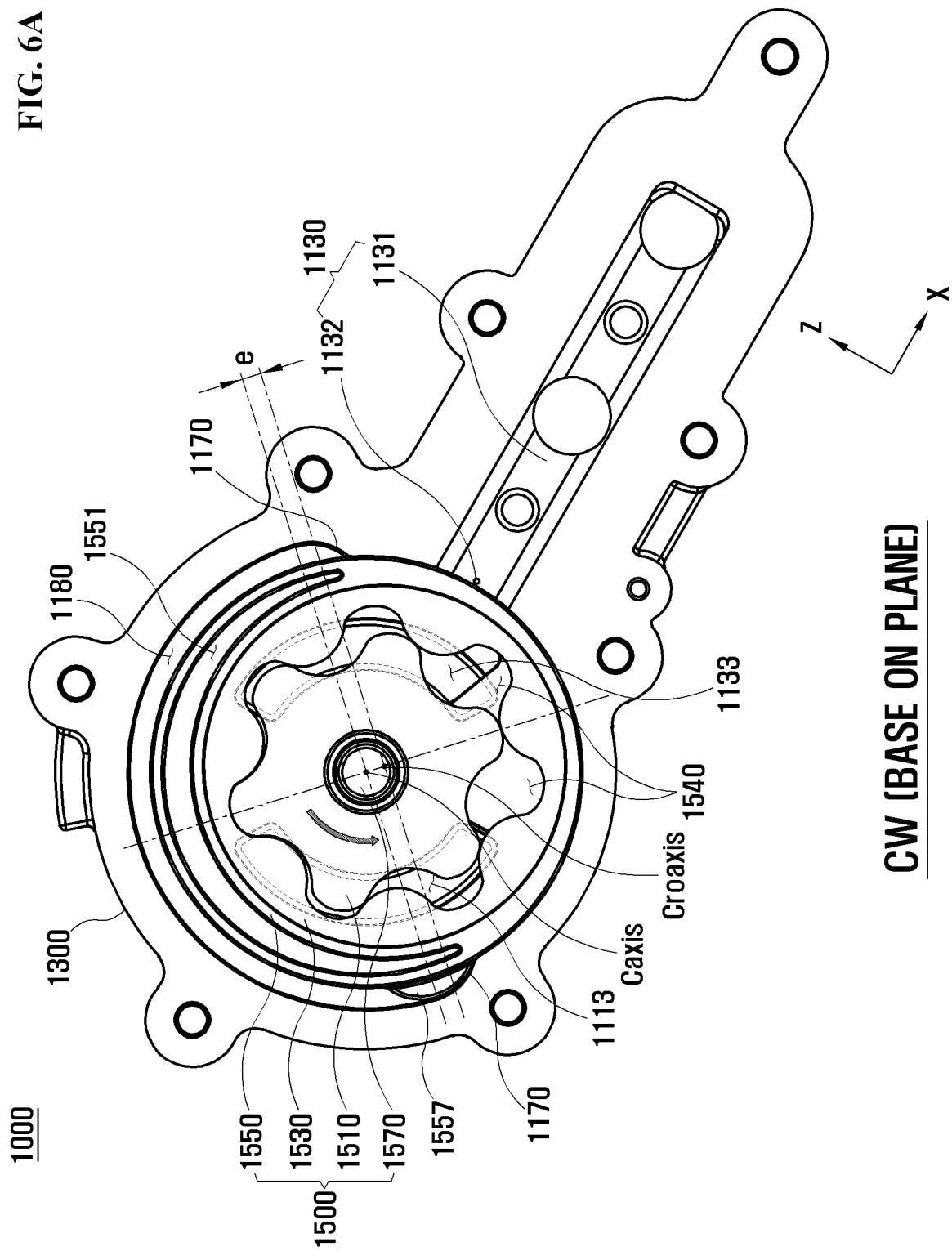
Figure 7A:
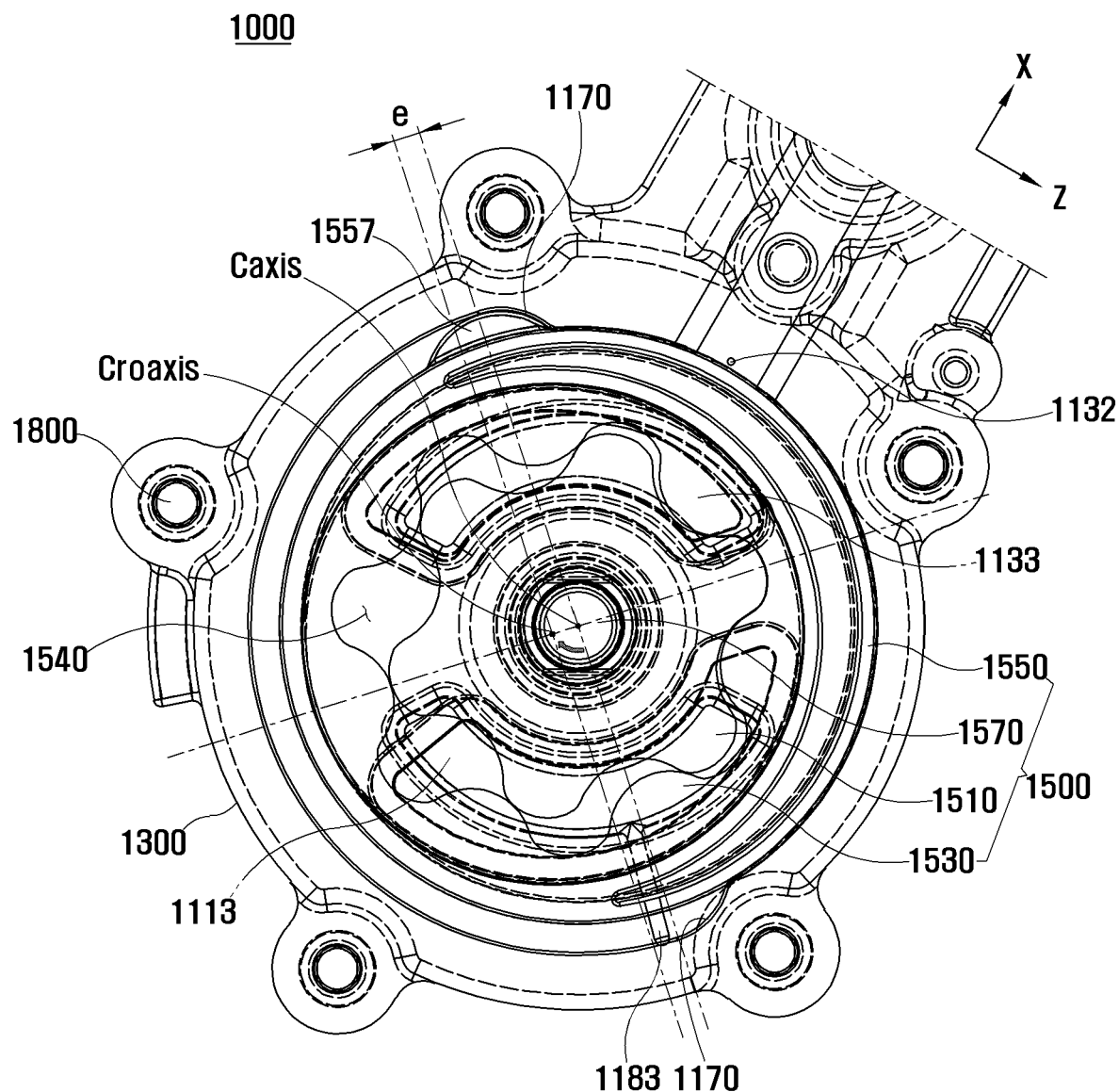
FIGS. 7A and 7B are cross-sectional views viewed from above illustrating a suction area a discharge area to describe a first position and a second position of a direction switching unit.
Figure 7B:
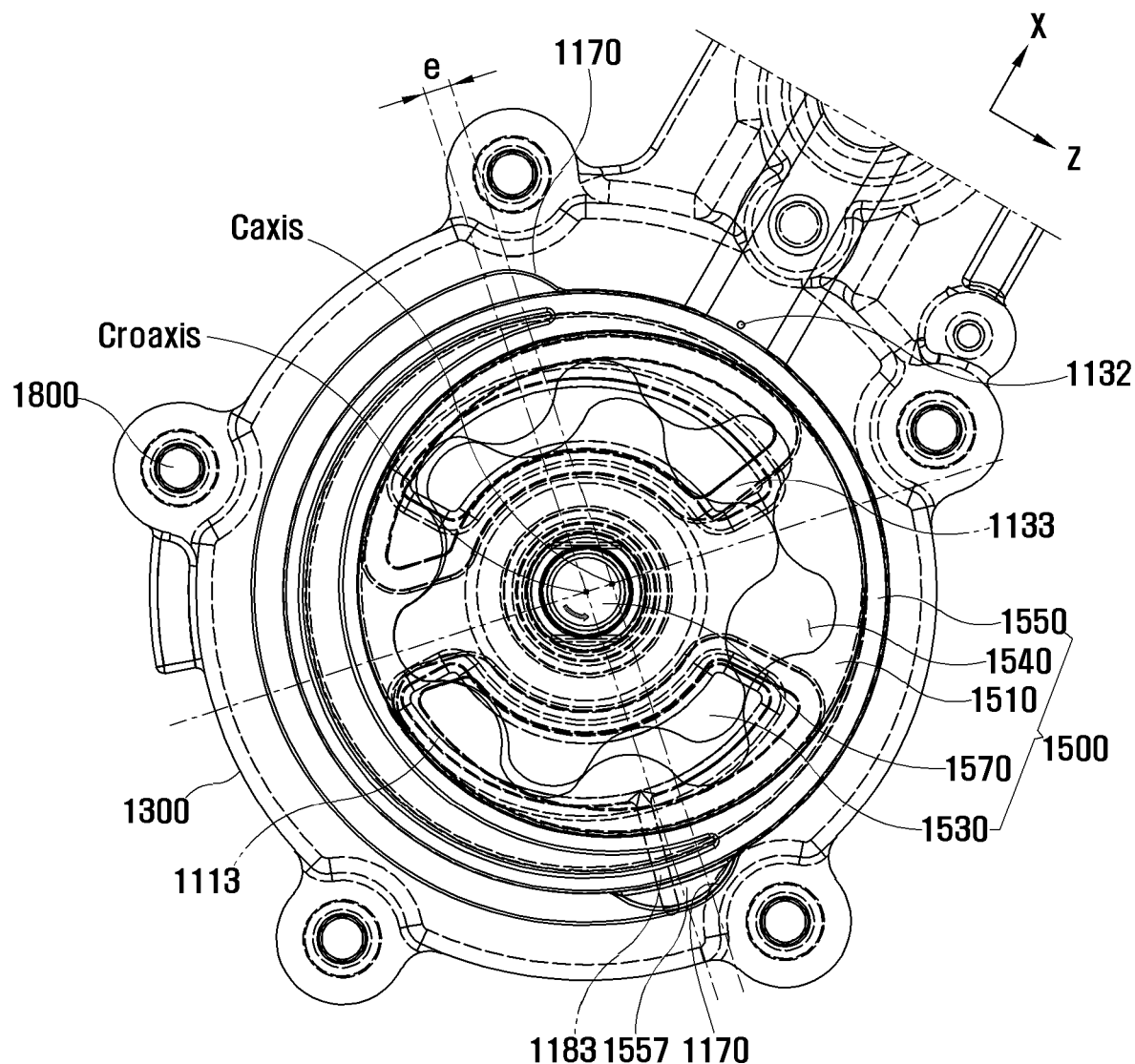

FIG. 1 is a perspective view of an oil pump according to an embodiment of the disclosure, FIG. 2 is a cross-sectional view taken along line II-II in FIG. 1, FIG. 3 is an exploded perspective view of an oil pump, FIG. 4 is a perspective view of a direction switching unit, FIG. 5 illustrates modeling that shows a process of sucking and discharging oil in a suction area, a pump model, and a discharge area, FIGS. 6A and 6B are cross-sectional views viewed from below to describe a first position and a second position of a direction switching unit, and FIGS. 7A and 7B are cross-sectional views viewed from above illustrating a suction area a discharge area to describe a first position and a second position of a direction switching unit.

The disclosure may be modified in various ways, and have various embodiments, and thus aspects (or embodiments) are described in detail in the following description. It should be understood, however, that the disclosure is not intended to be limited to particular forms disclosed, but on the contrary, is intended to cover all modifications, equivalents, and alternatives falling within the spirit and scope of the disclosure.

In the drawings, the same reference numerals, and in particular, reference numerals having the same tens and ones digits, reference numerals having the same tens digits, reference numerals having the same ones digits and letters represent members having the same function or similar functions. Unless stated otherwise, the members referred to by the reference numerals in the drawings may be identified as members corresponding to these criteria.

In the drawings, the sizes or thicknesses of the components are exaggerated to be large (or thick), small (or thin, or simplified in consideration of convenience of understanding of the components, or are simplified to express the components. However, the scope of protection of the disclosure should not be construed as being limited thereby.

Terms used in this specification are merely adopted to explain specific implementation examples (aspects) (or embodiments), and are not intended to limit the disclosure. As used herein, the singular forms "a", "an", and "the" are intended to include the plural forms as well, unless context clearly indicates otherwise. In this specification, the terms "include", "comprise", and the like are intended to indicate that characteristics, figures, steps, operations, constituents, and components disclosed in the specification or combinations thereof exist. The terms "include", "comprise", and the like should be understood as not precluding possibility of existence or addition of one or more other characteristics, figures, steps, operations, constituents, components, or combinations thereof.

Unless stated otherwise, all terms used herein, including technical or scientific terms, have the same meaning as commonly understood by those having ordinary skill in the art to which the disclosure pertains. Terms such as those defined in commonly used dictionaries are to be interpreted as having a meaning consistent with the meaning in the context of the related art and are not to be construed as ideal or overly formal in meaning unless expressly so-defined in the disclosure.

For convenience of description, it will be assumed as shown in FIG. 1 that an axis in front and back directions, which connects the central axis line of a discharge area and a rotary shaft is an 'X' axis, an axis in lengthwise direction of the rotational axis, i.e., up and down directions is a 'Y' axis, and an axis in left and right directions perpendicular to an X-Y plane is a 'Z' axis.

According to an embodiment of the disclosure, as shown in FIGS. 1 to 7B, an oil pump 1000 includes a pump module 1500 provided with a rotary shaft 1570, an inner rotor 1510 coupling with the rotary shaft 1570, an outer rotor 1530 rotated engaging with the inner rotor 1510, an inlet 1115 for sucking fluid, and an outlet 1135 for pressing and discharging the sucked fluid: housings 1100 and 1300 supporting the pump module 1500; and a direction switching unit 1550 coupled between the housings 1100 and 1300 and the outer rotor 1530 to keep an eccentric distance (see 'e' in FIGS. 6A to 7B) between the rotary shaft 1570 or the central axis line (see 'Caxis' in FIGS. 6A to 7B) of the inner rotor 1510 and the central axis line (see 'Croaxis' in FIGS. 6A to 7B) of the outer rotor 1530.

The oil pump 1000 may further include a power transmission unit 1700 including for example a gear as shown in FIG. 1 to transmit power to the rotary shaft 1570, and a fastening means 1800 including a bolt to coupling a housing main body 1100 and a housing cover 1300.

The housings 1100 and 1300 include a housing main body 1100 that forms an outer appearance, is partially provided with a suction area 1110 for sucking the fluid such as oil and a discharge area 1130 for discharging the fluid pressurized in a pressure chamber 1540, and accommodates and supports a portion of the rotary shaft 1570, the inner rotor 1510, the outer rotor 1530, and the direction switching unit 1550 therein; and a housing cover 1300 that is coupled to an upper side of the housing main body 1100, supports the pump module 1500, and forms a portion of the outlet 1135 while supporting the rotary shaft 1570 to protrude.

The suction area 1110, as shown in FIGS. 2 and 5 to 7B, includes the inlet 1115 through which the oil, i.e., the fluid is sucked: a suction channel 1111 through which the fluid is guided from the inlet 1115 to a suction port 1113; and a suction connecting member 1112 through which the suction channel 1111 communicates with the suction port 1113.

The suction port 1113 is recessed on each of the inner plate surface of the housing main body 1100 and the inner plate surface of the housing cover 1300, so that the pressure chamber 1540) formed between the inner rotor 1510 and the outer rotor 1530 and pressurizing the fluid sucked in the suction area 1110 can be connected to the suction area 1110 to guide the fluid sucked in the suction area 1110 to the pressure chamber 1540).

Meanwhile, the discharge area 1130, as shown in FIGS. 2 and 5 to 7B, includes the outlet 1135 through which the oil, i.e., the fluid, is discharged; and a discharge channel 1131 through which the fluid is guided from a discharge port 1133 to the outlet 1135.

The discharge port 1133 is recessed on each of the inner plate surface of the housing main body 1100 and the inner plate surface of the housing cover 1300, so that the pressure chamber 1540 formed between the inner rotor 1510 and the outer rotor 1530 and pressurizing the fluid sucked in the suction area 1110 can be connected to the discharge area 110 to guide the fluid discharged being pressurized in the pressure chamber 1540 to the discharge area 1130.

In addition, the discharge area 1130 may include a fine through hole, i.e., a mist hole 1132 (having a diameter of, for example, about 1 mm) branched from the discharge channel 1131 to cool down heat generated at a position where the power transmission unit 1700 including the gear is engaged. With the fluid sprayed from the mist hole 1132, the heat generated while power is transmitted through the engagement of the power transmission unit 1700 is cooled down.

A bearing 1160 including a bushing for rotatably supporting the rotary shaft 1570 is coupled to bearing supporting members 1150 and 1350 of the housing main body 1100 and the housing cover 1300. The bearing 1160 is internally provided with a bearing shaft hole 1330 to which the rotary shaft 1570 is coupled.

Engagement portions 1170 and 1557 are provided in the housings 1100 and 1300 and the direction switching unit 1550, so that the direction switching unit 1550 can be kept stopped at a first position and a second position while the rotary shaft 1570 is rotating between the first position (see FIGS. 6A and 7A) where the rotary shaft 1570 rotates in a first direction (see 'clockwise (CW) rotation' in FIGS. 6A and 7A) and the direction switching unit 1550 is kept stopped relative to the housings 1100 and 1300 and the second position (see FIGS. 3A and 4C) where the rotary shaft 1570 rotates in a second direction (see 'counterclockwise (CCW) rotation) in FIGS. 6B and 7B) and the direction switching unit 1550 is rotated from the first position and kept stopped relative to the housings 1100 and 1300.

The engagement portions 1170 and 1557 include a holding portion 1170 and a snag portion 1557.

The holding portion 1170 may be provided in one of the housings 1100 and 1300 and the direction switching unit 1550, and the snag portion 1557 may be provided in the other one of the housings 1100 and 1300 and the direction switching unit 1550. Below; for convenience of description, the holding portion 1170 is provided in the housing cover 1300, and the snag portion 1557 is provided in the direction switching unit 1550.

The holding portion 1170 engages with (comes into surface-contact with) the snag portion 1557 that sticks out from an upper portion on an outer circumferential surface of the direction switching unit 1550, thereby stopping and keeping the direction switching unit 1550 not to rotate any more relative to the housings 1100 and 1300. In other words, the holding portion 1170 at the first position (see the position in FIGS. 6A and 7A) and the holding portion 1170 at the second position (see the position in FIGS. 6B and 7B) are disposed forming 180 degrees with respect to the central axis line 'Croaxis' of the direction switching unit 1550.

The holding portions 1170 are formed at both ends of a sliding groove 1180 that is formed at a height corresponding to the height of the holding portion 1170 to guide the rotation of the snag portion 1557.

The snag portion 1557 sticks out from the outer circumferential surface of a switching portion skirt 1552 of the direction switching unit 1550, rotates along the sliding groove 1180, and is kept stopped to no longer rotate when stuck in the holding portion 1170. By the holding portion 1170 and the snag portion 1557, the direction switching unit 1550) can stably rotate between the first position and the second position.

The sliding groove 1180 guides the snag portion 1557 to slide while the direction switching unit 1550 moves between the first position and the second position.

In addition, a high-pressure discharge portion 1183 communicating with the suction port 1113 is formed in an area of the holding portion 1170 adjacent to the suction port 1113 where the pressure is low. In other words, while the direction switching unit 1550 positioned at the side of the discharge port 1133 rotates toward the position adjacent to the suction port 1113, the fluid between the sliding groove 1180 and the snag portion 1557 may be discharged through the high-pressure discharge portion 1183. Through the high-pressure discharge portion 1183, somewhat high-pressure oil is discharged toward the suction port 1113, thereby facilitating the rotation of the direction switching unit 1550.

The pump module 1500 includes the inner rotor 1510 having a shaft hole 1513 at the center thereof, to which the rotary shaft 1570 is coupled, rotating together with the rotary shaft 1570, and externally formed with teeth: the outer rotor 1530 internally formed with teeth to engage with the teeth of the inner rotor 1510; and the direction switching unit 1550 having an inner circumferential surface to be in contact with the outer rotor 1530 and an outer circumferential surface to be in contact with the inner circumferential surfaces of the housings 1100 and 1300.

The inner rotor 1510 and the outer rotor 1530 may have various types of teeth such as a cycloid teeth type.

The inner rotor 1510 and the outer rotor 1530 are not eccentric with their central axis lines, respectively.

The central axis line of the outer circumferential surface of the outer rotor 1530 or the central axis line 'Croaxis' of the inner circumferential surface of the direction switching unit 1550 being in contact with the outer circumferential surface of the outer rotor 1530 is eccentric with the central axis line 'Caxis' of the rotary shaft 1570 by a set distance (see 'e').

With this structure, the rotational central axis line 'Croaxis' of the outer rotor 1530, rotatably coupled to the inner circumferential surface of the direction switching unit 1550, is eccentric with the rotary shaft 1570 or the central axis line 'Caxis' of the inner rotor 1510 by the eccentric distance e.

Here, to make the direction switching unit 1550 rotate more effectively during the rotation, the outer circumferential surface, top surface and bottom surface of the direction switching unit 1550, or the inner circumferential surfaces, bottom surface and ceiling surface of the housings 1100 and 1300 may be formed with a plate surface lubrication groove 1551 to facilitate sliding.

According to an embodiment, the plate surface lubrication groove 1151 is formed on the direction switching unit 1550 and shown in FIGS. 6A and 6B. The lubrication groove 1551 includes a plate surface lubrication groove 1551 recessed on the bottom surface of the direction switching unit 1550.

Further, such a lubrication function may also be embodied by a recessed area (see the unshaded area in FIG. 4) on a switching portion upper plate 1553 of the direction switching unit 1550.

The direction switching speed of the direction switching unit 1550 may be varied depending on, for example, the rotation speed of the traction motor in the electric vehicle, which supplies the rotational power to the power transmission unit 1700.

For example, when the vehicle is driven at a low speed and the rotational power received from the power transmission unit 1700 is low; the rotary shaft 1570 rotates at a low speed and thus the rotation speed of the direction switching unit 1550, of which the direction is switched by the rotational power of the rotary shaft 1570, is also low. In such a case of the low rotation speed, a large amount of lubricating oil is not needed because overall parts of the vehicle, which require lubrication, also rotate at a low speed.

Meanwhile, the pressure chamber 1540 is connected to the suction port 1113 and the discharge port 1133 so that the fluid can be sucked into the suction area 1110 and discharged from the discharge area 1130 during the rotation of the direction switching unit 1550.

As shown in FIG. 2, the discharge port 1133 is formed on the bottom and ceiling surfaces of the housings 1100 and 1300 and communicates with the pressure chamber 1540, thereby guiding the fluid pressurized in the pressure chamber 1540 to the discharge area 1130. In addition, the suction port 1113 is formed on the bottom and ceiling surfaces of the housings 1100 and 1300 and communicates with the suction area 1110 and the pressure chamber 1540, thereby guiding the fluid sucked into the discharge area 1130 to the pressure chamber 1540.

The direction switching unit 1550 includes the switching portion skirt 1552 shaped like a ring to slide against the outer rotor 1530; and the switching portion upper plate 1553 shaped like a plate, slidably coupled to the insides of the housings 1100 and 1300, closing the upper end of the switching portion skirt 1552, and having switching portion through holes 1558 formed penetrating positions respectively corresponding to the suction port 1113 and the discharge port 1133 and allowing the fluid to be sucked and discharged.

The plate surface of the switching portion upper plate 1553 includes a switching portion sliding plate surface 1555, which is the hatched area in FIG. 4, being in surface contact with the housings 1100 and 1300, and the area excluding the switching portion sliding plate surface 1555 and the switching portion through hole 1558 and partially recessed to reduce friction while sliding against the housings 1100 and 1300. In addition, the switching portion upper plate 1553 is formed with a hole (not shown) at a central area thereof through which the rotary shaft 1570 passes.

According to the disclosure, the positions of the suction area 1110 and the discharge area 1130, and the positions of the suction port 1113 and the discharge port 1133 are not changed even though the rotational central axis line 'Croaxis' of the outer rotor 1530 is changed in position with respect to the central axis line 'Caxis' of the rotary shaft 1570 by the direction switching unit 1550.

Meanwhile, the forces acting on the components during the direction switching operations of the direction switching unit 1550 are as follows.

First, when the rotary shaft 1570 rotates, the inner rotor 1510 coupled to the rotary shaft 1570 rotates.

By the rotational force of the inner rotor 1510, the outer rotor 1530 engaging with the inner rotor 1510 rotates. The engagement between the inner rotor 1510 and the outer rotor 1530 may be achieved by the engagement of their teeth.

When the outer rotor 1530 rotates, internal friction is caused by the surface contact between the outer circumferential surface of the outer rotor 1530 and the inner circumferential surface of the switching portion skirt 1552 of the direction switching unit 1550. Further, when the outer rotor 1530 rotates, upper friction is caused by the surface contact between the upper plate surface of the outer rotor 1530 and the inner plate surface of the switching portion upper plate 1553 of the direction switching unit 1550.

By the internal friction and the upper friction, the direction switching unit 1550 generates centrifugal force when the direction switching unit 1550 rotates. At the same time, the outer circumferential surface, bottom surface, and top surface of the direction switching unit 1550 are in surface contact with the inner circumferential surfaces, bottom surface and ceiling surface of the housings 1100 and 1300, thereby causing external friction that resists the rotation.

With the action of these forces, the direction switching unit 1550 rotates in the rotational direction of the rotary shaft 1570 when the sum of the internal friction, the upper friction, and the centrifugal force of the direction switching unit 1550 is greater than the external friction. With the action of these forces, the direction switching unit 1550 rotates and moves from the first position to the second position or from the second position to the first position.

To minimize the external friction, i.e., the force that resists the direction switching force of the direction switching unit 1550, the lubrication groove 1551 is provided as described above.

With this configuration, it will be described below in more detail with reference to FIGS. 7A and 7B that the oil pump 1000 sucks and pressurizes the fluid at the first position and the second position.

First, FIG. 7A shows that the direction switching unit 1550 is kept stopped at the first position.

When the rotary shaft 1570 rotates by first rotation (i.e. clockwise (CW) rotation), the inner rotor 1510 coupled to the rotary shaft 1570 rotates and the outer rotor 1530 engaging with the inner rotor 1510 rotates along the inner circumferential surfaces of the housings 1100 and 1300 as being eccentric with the rotary shaft 1570 by the eccentric distance e.

By this rotation, the fluid is introduced into the pressure chamber 1540 through the suction port 1113 of the suction area 1110 as the volume of the pressure chamber 1540 increases gradually, and the fluid introduced by the increased volume is pressurized as the volume of the pressure chamber 1540 decreases gradually and discharged to the discharge area 1130 through the discharge port 1133.

Next, FIG. 7B shows that the direction switching unit 1550 rotates 180 degrees from the first position and is kept stopped at the second position.

When the rotary shaft 1570 rotates by second rotation (i.e., counterclockwise (CCW) rotation), the inner rotor 1510 coupled to the rotary shaft 1570 rotates and the outer rotor 1530 engaging with the inner rotor 1510 rotates along the inner circumferential surfaces of the housings 1100 and 1300 as being eccentric with the rotary shaft 1570 by the eccentric distance e.

By this rotation, the fluid is introduced into the pressure chamber 1540 through the suction port 1113 of the suction area 1110 as the volume of the pressure chamber 1540 increases gradually, and the fluid introduced by the increased volume is pressurized as the volume of the pressure chamber 1540 decreases gradually and discharged to the discharge area 1130 through the discharge port 1133.

In other words, the suction area 1110 and the discharge area 1130 are not changed in position even though the direction switching unit 1550 rotates by the clockwise rotation for the first position and by the counterclockwise rotation for the second position.

Due to this structure, the positions of the suction area 1110 and the discharge area 1130, and the positions of the suction port 1113 and the discharge port 1133 are not changed even though the direction switching unit 1550 is kept stopped at the first position and the second position.

With this configuration, the direction switching operations of the direction switching the direction switching unit 1550 of the oil pump 1000 will be described below in more detail with reference to FIGS. 6A and 6B. Unlike FIGS. 7A and 7B, it should be understood that FIGS. 6A and 6B are the cross-sectional views not viewed from above (based on a plane) in FIGS. 1 to 3 but viewed from below in FIGS. 1 to 3.

First, FIG. 6A shows that the rotary shaft 1570 rotates in the first direction, i.e., the clockwise direction in the state that the direction switching unit 1550 is kept stopped at the first position.

When the rotary shaft 1570 rotates clockwise (based on the plane) and then rotates counterclockwise, the inner rotor 1510 coupled to the rotary shaft 1570 rotates counterclockwise and the outer rotor 1530 engaging with the inner rotor 1510 also rotates counterclockwise.

By the counterclockwise rotation of the outer rotor 1530, the direction switching unit 1550 is gradually rotated counterclockwise (based on the plane) as shown in FIG. 4B due to the internal friction caused by the surface contact between the outer circumferential surface of the outer rotor 1530 and the inner circumferential surface of the direction switching unit 1550 and the centrifugal force of the direction switching unit 1550, and kept stopped at the second position by the engagement portions 1170 and 1557. In this way, the counterclockwise rotation of the rotary shaft 1570 is stably achieved in the state that the direction switching unit 1550 is kept stopped at the second position.

Such direction switching may be performed in, for example, about 1 second.

In addition, a position determining pin 1107 and a determining pin hole 1108 are publicly known means for stably keeping the positions when the housing main body 1100 and the housing cover 1300 are coupled.

Thus, according to the disclosure, there is provided an oil pump used for both forward rotation and reverse rotation, which does not require changing a suction area and a discharge area even when a power source rotates forwardly and reversely.

Further, there is provided an oil pump used for both forward rotation and reverse rotation, in which direction switching is stably performed even when a power source rotates forwardly and reversely.

Further, there is provided an oil pump used for both forward rotation and reverse rotation, which has a wide application range because it does not require structural change even when a power source rotates forwardly and reversely, and has a simple structure, is convenient to use, and improves economic feasibility because it does not require additional parts.

Further, there is provided an oil pump that cools heat generated in parts where power transmission is performed.

Although various embodiments of the disclosure are illustrated and described herein, various changes can be made without departing from the principle or spirit of the disclosure by a person having ordinary knowledge in the art to which the disclosure pertains. The scope of the disclosure is defined by the appended claims and their equivalents.

<DESCRIPTION OF REFERENCE NUMERALS>

1000: oil pump
1100: housing main body
1103: inner ring contact member
1107: position determining pin
1108: determining pin hole
1110: suction area
1111: suction channel
1112: suction connecting member
1113: suction port
1115: inlet
1130: discharge area
1131: discharge channel
1132: mist hole
1133: discharge port
1135: outlet
1150: bearing supporting member
1160: bearing
1170: holding portion
1180: sliding groove
1183: high-pressure discharge portion
1300: housing cover
1330: bearing shaft hole
1350: bearing supporting member -continued <DESCRIPTION OF REFERENCE NUMERALS>

1500: pump module
1510: inner rotor
1513: shaft hole
1530: outer rotor
1540: pressure chamber
1550: direction switching unit
1551: plate surface lubrication groove
1552: switching portion skirt
1553: switching portion upper plate
1555: switching portion sliding plate surface
1557: snag portion
1558: switching portion through hole
1570: rotary shaft
1700: power transmission unit
1800: fastening means
Caxis: rotary shaft the central axis line
Croaxis: outer rotor the central axis line
e: eccentric distance

The invention claimed is:

1. An oil pump comprising:
a pump module provided with a rotary shaft, an inner rotor coupling with the rotary shaft, an outer rotor rotated engaging with the inner rotor, an inlet for sucking fluid, and an outlet for pressing and discharging the sucked fluid;
housings supporting the pump module; and
a direction switching unit coupled between the housings and the outer rotor to keep an eccentric distance between the rotary shaft or a central axis line of the inner rotor and a central axis line of the outer rotor, wherein
the pump module comprises a suction area where oil is sucked, and a discharge area where the oil sucked in the suction area is pressurized and discharged,
the oil pump further comprises a power transmission unit comprising a gear to rotate the rotary shaft,
the discharge area comprises a mist hole branched from and passing through the discharge area to spray high-pressure oil to an area where the power transmission unit is engaged.

2. The oil pump of claim 1, wherein the eccentric distance is kept but an eccentric direction of the eccentric distance with respect to a central axis line of the rotary shaft is different as the direction switching unit rotates upon change in a rotational direction of the rotary shaft.

3. The oil pump of claim 2, having a first position where the direction switching unit is kept stopped relative to the housings as the rotary shaft is rotated in a first direction and a second position where the direction switching unit is rotated from the first position and kept stopped relative to the housing as the rotary shaft is rotated in a second direction, wherein the first position and the second position are disposed forming 180 degrees with respect to the central axis line of the rotary shaft.

4. The oil pump of claim 3, wherein the suction of the fluid into the inlet and the discharge of the pressurized fluid from the outlet are performed equally at both the first position and the second position.

5. The oil pump of claim 3, wherein
the housings and the direction switching unit comprise engagement portions to keep the direction switching unit stopped at the first position and the second position, and
the engagement portions comprise a snag portion that sticks out from one of the housings and the direction switching unit, and a holding portion formed in the other one of the housings and the direction switching unit and engaging with the snag portion.

6. The oil pump of claim 5, wherein one of the housings and the direction switching unit comprises a sliding groove formed to guide the snag portion to move between the first position and the second position.

7. The oil pump of claim 6, wherein high-pressure oil generated in the sliding groove is discharged through a suction area for the suction while the snag portion gets stuck in the holding portion at the first position or the second position.

8. The oil pump of claim 3, wherein the direction switching unit rotates between the first position and the second position by frictional and inertial forces of the outer rotor rotated engaging with the inner rotor.

9. The oil pump of claim 1, wherein
a central axis line of an outer circumferential surface of the direction switching unit being in surface contact with an inner circumferential surface of the housing is the same as a central axis line of the rotary shaft, and
the central axis line of the inner circumferential surface of the direction switching unit being in surface contact with the outer circumferential surface of the outer rotor is eccentric with the central axis line of the rotary shaft by the eccentric distance.

10. The oil pump of claim 1, wherein
the pump module comprises the inner rotor coupling with the rotary shaft, and the outer rotor eccentrically rotated engaging with the inner rotor,
the direction switching unit comprises a switching portion skirt shaped like a ring to slide against the outer rotor; and a switching portion upper plate shaped like a plate, slidably coupled to the insides of the housings, closing an upper end of the switching portion skirt, and having an open area through which fluid is allowed to be sucked and discharged, and
a plate surface of the switching portion upper plate is partially recessed to reduce a contact area with the housings.

11. The oil pump of claim 1, wherein the direction switching unit rotates toward a set position with respect to the housings upon change in a rotational direction of the rotary shaft.

* * * * *